: 
United States Patent
El-Zehiry et al.

(10) Patent No.: US 9,129,391 B2
(45) Date of Patent: Sep. 8, 2015

(54) SEMI-AUTOMATED PREOPERATIVE RESECTION PLANNING

(71) Applicant: Siemens Aktiengesellschaft, Munich (DE)

(72) Inventors: Noha Youssry El-Zehiry, Plainsboro, NJ (US); Leo Grady, Millbrae, CA (US); Michal Sofka, Franklin Park, NJ (US); Christian Tietjen, Furth (DE); Shaohua Kevin Zhou, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 13/622,394

(22) Filed: Sep. 19, 2012

(65) Prior Publication Data

US 2013/0077842 A1    Mar. 28, 2013

Related U.S. Application Data

(60) Provisional application No. 61/540,211, filed on Sep. 28, 2011.

(51) Int. Cl.
    *G06K 9/00* (2006.01)
    *G06T 7/00* (2006.01)

(52) U.S. Cl.
    CPC ............ *G06T 7/0093* (2013.01); *G06T 7/0081* (2013.01); *G06T 2207/10081* (2013.01); *G06T 2207/20096* (2013.01); *G06T 2207/20156* (2013.01); *G06T 2207/30056* (2013.01)

(58) Field of Classification Search
    None
    See application file for complete search history.

(56) References Cited

U.S. PATENT DOCUMENTS

| | | | | |
|---|---|---|---|---|
| 8,750,585 | B2 * | 6/2014 | Liu | 382/128 |
| 2005/0286750 | A1 * | 12/2005 | Dehmeshki | 382/131 |
| 2007/0025616 | A1 * | 2/2007 | Grady et al. | 382/173 |
| 2007/0265813 | A1 * | 11/2007 | Unal et al. | 703/2 |
| 2009/0003672 | A1 * | 1/2009 | Maier et al. | 382/128 |
| 2009/0129673 | A1 * | 5/2009 | Simon et al. | 382/173 |
| 2010/0166275 | A1 * | 7/2010 | Liu | 382/131 |
| 2012/0134552 | A1 * | 5/2012 | Boettger | 382/128 |
| 2013/0063434 | A1 * | 3/2013 | Miga et al. | 345/420 |

OTHER PUBLICATIONS

Jolly et al. "3D General Lesion Segmentation in CT" IEEE, 978-1-4244-2003-2/08 , 2008.*
L. Grady, et al., "Random Walks for Image Segmentation," IEEE Transactions on Pattern Analysis and Machine Intelligence, vol. 28, No. 11, pp. 1768-1783, Nov. 2006.

(Continued)

*Primary Examiner* — Bhavesh Mehta
*Assistant Examiner* — Oneal R Mistry

(57) ABSTRACT

Preoperative resection planning is assisted by a computer. Rather than rely on interpolation of the user input, a graph of interconnections is used. The user inputs one or more polylines on one or more two-dimensional views. The polylines are used to assign resection and remnant seeds with a band of unassigned locations. The 2D seeds are used with the graph of interconnections to assign different voxels in the volume, including the unassigned locations, as being part of the resection volume or part of the remnant volume.

12 Claims, 5 Drawing Sheets

(56) References Cited

OTHER PUBLICATIONS

J. Kretschmer, et al., "Workflow-oriented Planning of Liver Resections," Master's thesis, Friedrich-Alexander-Universität Erlangen-Nürnberg, 2010.

C. Hansen, et al., "Integration of computer assisted surgery and intraoperative navigation in complex liver surgery and tumorablation: First results after treatment of 10 patients," CARS 2010, International journal of computer assisted radiology and surgery 5. 2010, Supplement 1, pp. 119-120.

* cited by examiner

SEMI-AUTOMATED PREOPERATIVE RESECTION PLANNING

RELATED APPLICATIONS

The present patent document claims the benefit of the filing date under 35 U.S.C. §119(e) of Provisional U.S. Patent Application Ser. No. 61/540,211, filed Sep. 28, 2011, which is hereby incorporated by reference.

BACKGROUND

The present embodiments relate to planning for resection. Preoperative surgery planning is a preliminary step for a tumor resection procedure.

To plan for resection, computed tomography (CT) scanning of the patient is performed. The resulting data representing a volume is presented to the physician in a series of parallel slices. A physician may view the slices in the series to define the resection surface in three dimensions. However, it is very tedious to mark the resection surface in the patient's CT scan slice by slice.

Computer-aided liver resection tools may provide a three-dimensional (3D) resection surface from a limited input by the physician. For example, the user inputs a number of points. The contour is interpolated into the volume using radial basis functions (RBF) or principal component analysis (PCA) to obtain the resection surface. However, interpolation techniques are neither accurate nor intuitive. The accuracy of the interpolated surface depends on the number of points provided by the user. Minor changes in the input points may highly influence the coefficients of the PCA or RBF, so that minor changes in the input do not necessarily mean minor changes in the resection surface. Conflicting inputs (i.e., inputs suggesting different labeling of the resection and the remnant for the same voxel) highly degrade the quality of the resection surface. Conflicting inputs may easily occur as the user draws the resectors in 2D planes since the user may not have a sense of how these multiple resectors may interact in 3D.

BRIEF SUMMARY

By way of introduction, the preferred embodiments described below include methods, systems, instructions, and computer readable media for preoperative resection planning. Liver resection planning using CT is provided below, but any organ and/or modality may be used. Rather than rely on interpolation of the user input, a graph of interconnections is used. The user inputs one or more polyline on one or more two-dimensional views. The polylines are used to assign resection and remnant seeds with a band of unassigned locations. The seeds are used with the graph of interconnections to assign different voxels in the volume, including the unassigned locations of the band, as being part of the resection volume or part of the remnant volume.

In a first aspect, a method is provided for preoperative resection planning. Data representing a volume of a liver of a patient is acquired. A two-dimensional view of a slice of the liver is generated from the data. User input of a plurality of points or line relative to the two-dimensional view is received from a user input device. A processor creates a contour in the slice from the points or line, identifies first and second seeds separated by the contour and a band around the contour from the of the slice, and segments the volume into first and second three-dimensional portions based on the first and second seeds from the slice. An image showing a resection as the first three-dimensional portion is output.

In a second aspect, a non-transitory computer readable storage medium has stored therein data representing instructions executable by a programmed processor for liver resection planning. The storage medium includes instructions for creating a graph of interconnections from scan data of a liver of a patient, separating the graph into a resection volume and a remnant volume as a function of the graph, and outputting the resection volume or the remnant volume.

In a third aspect, a non-transitory computer readable storage medium has stored therein data representing instructions executable by a programmed processor for liver resection planning. The storage medium includes instructions for generating resection and remnant seeds as a function of user input of locations in a plane, and dividing a liver volume into a resection volume and a remnant volume as a function of the resection and remnant seeds and an interconnection lattice of the liver volume.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In liver surgery, tumor resection is used to remove the malignant part of the liver. This procedure uses preoperative planning before the actual intervention. The main objective of the planning is to define a liver resection surface that separates the part of the liver to be resected from the remnant or remaining part of the liver. The resection surface should provide for removal of the tumor without devascularization of the healthy liver parenchyma or remnant.

Computer aided interactive liver resection assists in defining the resection surface, but with minimal or reduced user interaction than manually defining the entire surface in three-dimensions. An interactive system is provided for tumor resection. The surgeon draws a polyline in a 2D view of a CT scan of the patient. The system, using the polyline, provides a 3D surface that partitions the volume into remnant liver and resected liver.

The resection tool or system may be fast, intuitive and capable of providing an accurate resection surface from minimal user input. Using a simple, single 2D resector in a single view provides for minimal user input. The polyline may be composed of just two points in a single view. The system may be intuitive by resolving inputs of multiple contours in the same view or different views without drastic changes in the resection surface. The system may operate on a segmented mask of the liver and may not require an original image volume of tissues in addition to the liver to be present.

In one embodiment, the liver resection is treated as a graph partitioning problem. The graph is defined as the portion of the 3D voxel lattice representing the presegmented liver (i.e., the graph is defined for the voxels representing the liver). A vertex in a graph is associated with every voxel in the segmented liver in the 3D CT scan, and the objective is to partition the graph in two disjoint sets that represent the resected liver and remnant liver. To solve this partitioning problem, a signed distance map from a contour derived from the user input points is created. The distance map is thresholded to generate 2D foreground and background seeds in the plane where the user input was drawn. A 3D random walker segmentation is performed with the seeds to obtain the targeted partitioning. Minor changes in the input points may only cause minor changes in the distance map calculation, the resulting seed locations, and the resulting partitioning. The resection system may be more reliable and stable than interpolation-based resection techniques.

Figure 1:
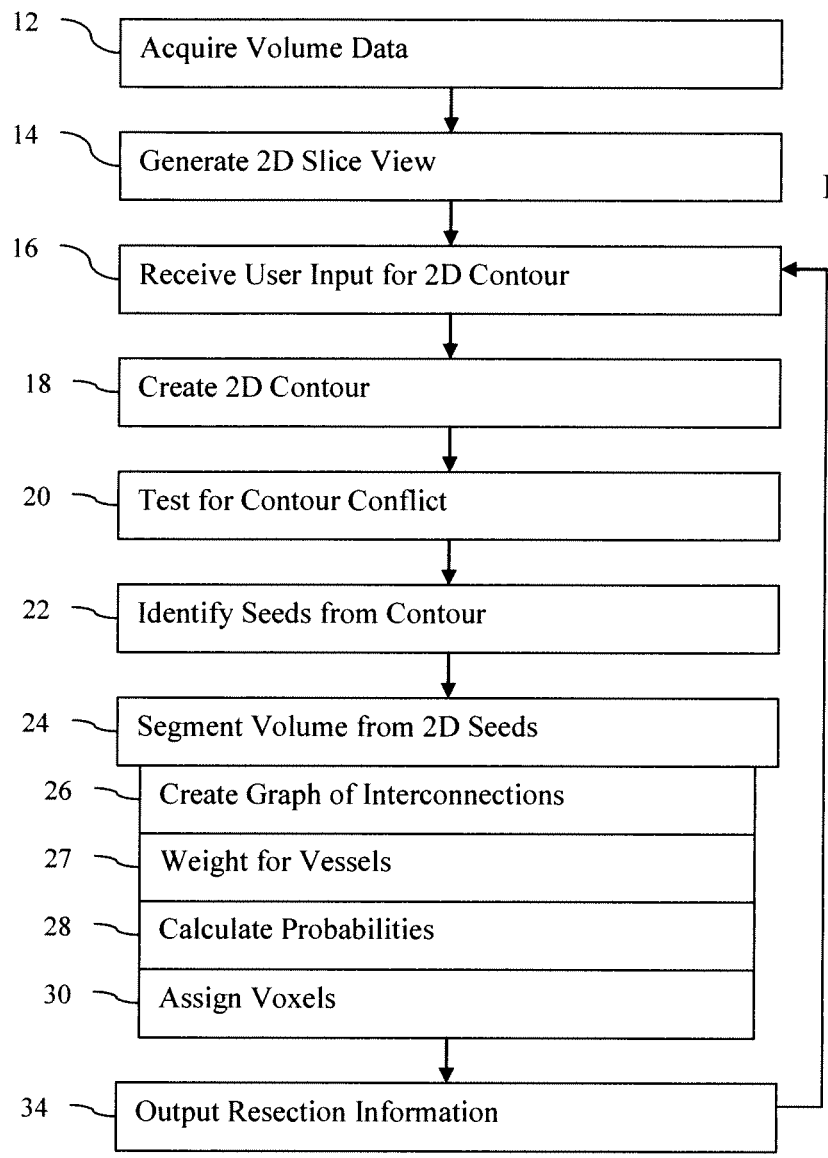
FIG. 1 is a flow chart diagram of one embodiment of a method for resection planning.

Instead of tumor segmentation and resection, lobe segmentation and resection may be provided. While the resection of a liver is discussed herein, the approach may be applied to resection of any other organ. The system is general and may be used in any oncology application that requires resection planning. The resection is discussed with respect to removing a tumor, but may be used for other purposes. Similarly, the discussion herein uses CT data, but other imaging modalities (e.g., ultrasound, emission tomography, or magnetic resonance) may be used. The image is used to guide the user to draw the resector regardless of the modality FIG. 1 shows a flow chart of a method for preoperative liver resection planning. The method is for preoperative liver resection planning. A surface in three-dimensions through the liver is located. The resection surface extends between the edges of the liver. The resection surface may have a general shape, such as cylindrical, planar, conical, or other shape, or may have a more complex shape. The shape may be constrained to remove gaps and/or avoid high frequency variation.

Figure 9:
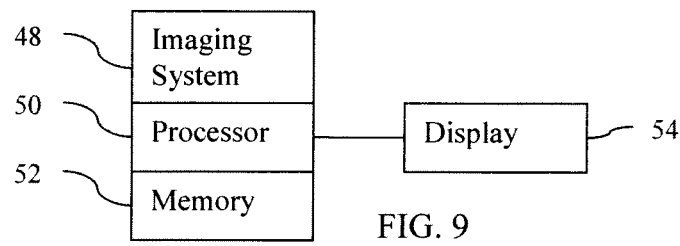
FIG. 9 is one embodiment of a system for liver resection planning.

The method is implemented by the system of FIG. 9 or another system. For example, the method is implemented on a computer or processor associated with a magnetic resonance (MR), computed tomography (CT), ultrasound, emission, x-ray or other imaging system. As another example, the method is implemented on a picture archiving and communications system (PACS) workstation or server. In yet another example, the method is implemented on a personal computer or other processor.

The acts are performed in the order shown or other orders. Additional, different, or fewer acts may be provided. For example, the method is performed with seeds determined without one or more of acts 12-22. As another example, act 34 is not performed. Acts 26-30 represent one approach, but other approaches using none or fewer than all of acts 26-30 may be used.

In act 12, data representing a volume of the liver of a patient is acquired. The data is a frame of data representing the patient at a given time or period. For example, the data represents voxels in a N×M×P volume where N, M, and P are positive integers greater than one. The data represents a three-dimensional region of the patient. The data may be in any format. The data may represent different locations in a Cartesian or polar coordinate format. The data is intensities, gray scale values, or color values (e.g., RGB values).

Any modality may be used to acquire the data. In one embodiment, the data is acquired with a computed tomography (CT) scan. Magnetic resonance, ultrasound, positron emission tomography, or single photon emission computed tomography may be used. The data is acquired by scanning the patient. All or a part of the patient is scanned. Only the liver or the liver and surrounding tissue may be scanned.

In alternative embodiments, the data is acquired by transfer from another device or loading from storage. The data may be from a model of the liver for the patient or from a previous scan.

The data associated with the liver of the patient is selected. The data for the liver is all of the data or a sub-set. Where the data for the liver is a sub-set, the data for the liver is segmented from the data for other tissues or structures. Voxels of the scan volume responsive to liver tissue are identified and selected. The surrounding tissue is not selected.

Any segmentation may be used. For example, intensity thresholding, surface detection, edge detection, gradient processes, filtering, combinations thereof, or other segmentation is used. The segmentation may be automatic, manual, or semi-automatic. In one embodiment, the voxels for the liver are segmented from the voxels for the surrounding tissue using a machine-trained or learnt classifier. Haar-wavelet, steerable, and/or other features are calculated from the data. These features are input to the classifier. A label as liver or not is output by the classifier for each voxel.

The segmentation may be represented as a liver segmentation mask L, where $L(v)=1$ if voxel v is a liver voxel and $L(v)=0$ if voxel v does not belong to the liver. The mask is created for a given set of data and/or loaded from an electronic storage device, memory or a communication channel which provides the segment mask from an external source or other process.

In act 14, a two-dimensional view of a slice of the liver is generated. The view is generated from the data acquired in act 12. Alternatively, the view is generated from different data, such as data representing the liver at a different time or from a different modality. Using data processing, calibration, or other measurements, the coordinates and corresponding transform of locations in one data space to another data space is used to relate locations in the view to the data representing the volume.

The two-dimensional view is of a plane through the liver. Any arbitrary or standard plane may be used. For example, the user positions the plane to provide a cross-section that includes a tumor and/or vessel. Automated cross-section viewing may be provided. More than one two-dimensional view may be used, such as outputting a multi-planar reconstruction to a display. The multi-planar reconstruction may show images for three orthogonal planes through the liver. For example, FIG. 6 shows three two-dimensional views oriented relative to the patient in the upper two images and the lower, left image.

Figure 6:
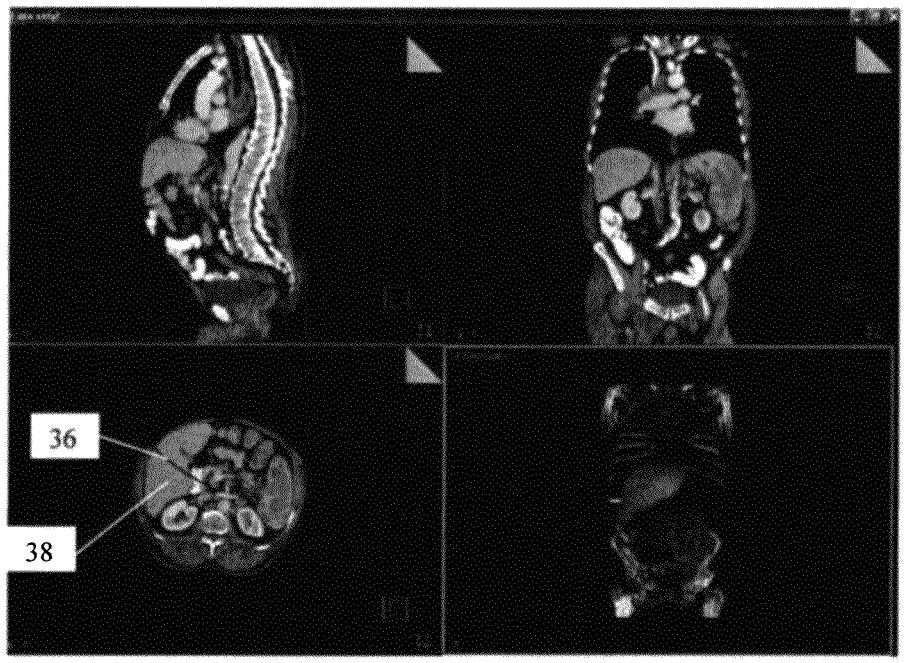
FIG. 6 is an example medical image showing three 2D views of a liver, one with a user drawn contour, and a 3D rendering of the liver.

The two-dimensional view may include the data prior to segmenting the liver, so includes other tissue as shown in FIG. 6. Alternatively, the two-dimensional view is only of the liver.

In act 16, user input for a resection contour is received. Signals from a user input device are received. The signals may be from a keyboard, mouse, touchpad, touch screen, track ball, and/or other user input device.

The input is a polyline on the two-dimensional view. For example in reference to FIG. 6, the user draws a line 36 through the liver 38 on one of the two-dimensional views. The line intersects the liver boundary in two points, but may shorter (i.e. intersects the liver boundary in one point). Rather than a continuous line, the user may input two or more points as the polyline. For example, the user's perceived continuous line may be sampled at a resolution less than that of the data so that the line is a series of non-connected points. As another example, the user inputs two or more points to indicate generally where the line would be without having to draw a line. The line or series of points is straight or curved.

User input of the polyline of a desired resection on the 2D view is received from the user. The points or line are in the 2D plane of the view despite the liver being a three-dimensional object.

Defining a 3D cutting surface using a single 2D polygon is an ambiguous problem. In practice, the surgeon draws several contours, possibly in different planes, to guide the resection process. More than one line or series of points may be entered. For example, the user may enter multiple lines or series of points on the same 2D view. As another example, the user may enter different lines or series of points on different 2D views, such as entering on two or three of the orthogonal multi-planar views of FIG. 6. The user may enter different lines or points for different planes in a stack of parallel planes. The user enters on fewer than all planes through the liver.

In act 18, a contour is created from the received polyline. The user input points or line are used to generate a continuous line relative to the resolution or sampling of the data. The processor generates the contour without further user input, but more input may be provided.

The contour is in the plane or slice of the 2D view for which the polyline is provided. The contour defines the resection in the plane relative to the data for the liver volume. Where the user input is less than a continuous line from one edge to another edge, the processor completes the contour. The points or line are extended as a continuous curve between edges of the liver.

The contour is created by extrapolation, interpolation, and/or line fitting. In one embodiment, the continuous contour of the input points is computed by linear interpolation of every two successive points. A line is fit between each pair of points. The incomplete resector provided by the user is completed by interpolating the input resector. For end points within the liver but not at the edge, the end points may be projected to the nearest edge. The projection may be an extrapolation from two points including the end point of the input. For example, the first two points of the polyline are interpolated to a straight line and, the intersection of the line with the image or liver boundary in the plane is found. The line as extrapolated to the intersection is part of the contour. Similarly, the last two points of the polyline are interpolated to a straight line, and the intersection of the line with the image or liver boundary in the plane is found. The line as extrapolated to the intersection is part of the contour.

In other embodiments, a line fitting is performed. The line fitting may be constrained, such as fitting a polynomial of a limited order.

The created contour may be altered or limited. For example, the created contour is low pass filtered to remove high frequency variation. Any angles may be limited to less than a maximum angle.

Different polylines for the same volume may be formed into contours in the same or different ways. For example, if the incomplete polyline is used for the first contour, then the incomplete polyline is completed by linear interpolation of its voxels. The same or different approach may be used for any subsequently created contours. Where multiple user input polylines are provided, multiple contours are created. Alternatively or additionally, multiple polylines are combined into one contour.

Introducing multiple contours poses a problem of conflicting seeds from the different contours and ambiguity with respect to whether the contour is a correction, replacement, extension, modification, or independent of other contours. For polylines on different planes, an independent contour is created for each.

In act 20, the processor tests for conflicts between different contours. The test is performed as each new contour is generated or after all contours are created. The results of the test may be used to alter or limit the contour and/or seeding.

More than one test may be performed. For example, conflicts between seeding are identified. Each contour separates possible seeds from each other. One seed is for resection and another seed is for the remnant. Seeds on different planes should be consistent. If the set Res represents the resected liver and the set Rem represents the remnant liver, then all the foreground seeds in all the planes must be a subset of Rem and all the background seeds must be a subset of Res.

Figure 2:
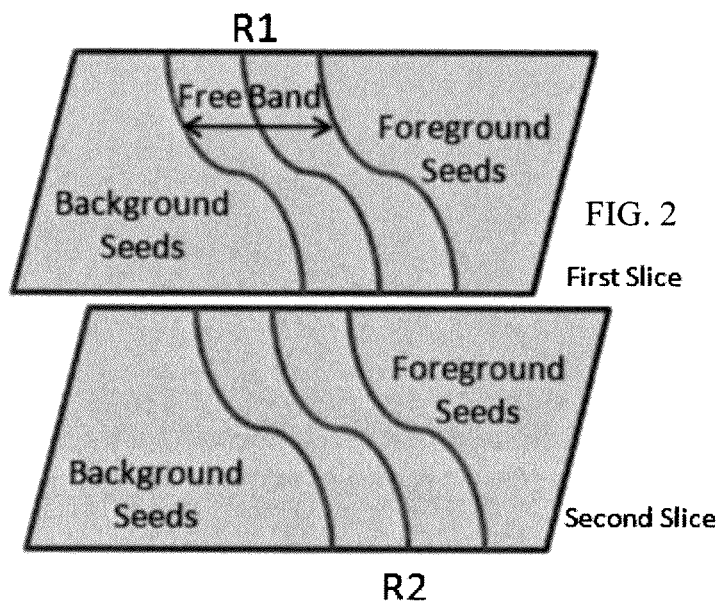
FIG. 2 illustrates an example of identifying seeds in multiple slices with consistent seeding.

FIG. 2 shows contours R1 and R2 with no conflicts in seeding. The contours R1 and R2 are in parallel planes. Since the same sides of the contours R1 and R2 are seeded as background and foreground, not conflict is found. The seeding is consistent between the contours on different planes. A set of contours are non-conflicting contours if the seeds generated by all contours do not exhibit any conflict.

Figure 3:
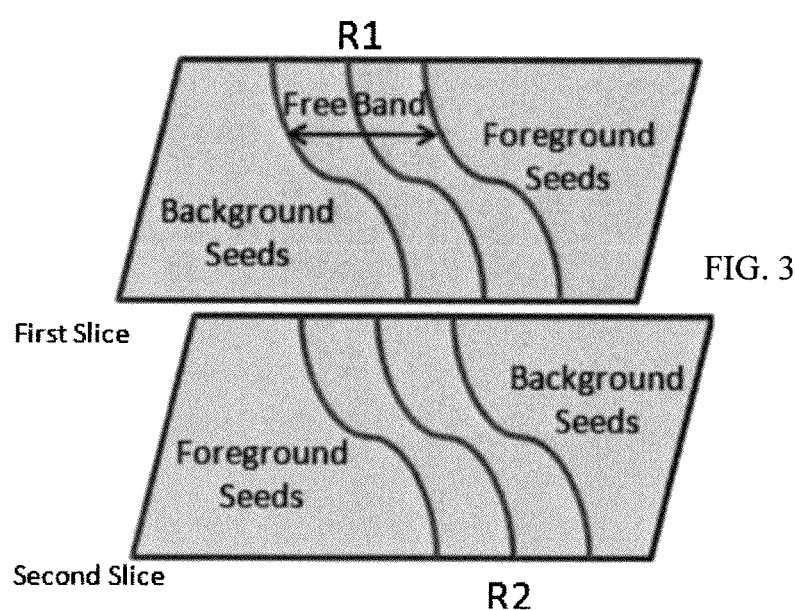
FIG. 3 illustrates an example of identifying seeds in multiple slices with inconsistent seeding.

FIG. 3 shows inconsistent seeding. The left side of the contour R1 is seeded as background, but the left side of contour R2 in the parallel plane is seeded as foreground. Inconsistent seeding occurs when one contour suggests a voxel to be seeded to a particular label and another contour suggests a different seeding for a similar voxel (same voxel, adjacent voxel, or voxel with a spatial relationship) in a parallel slice that may cause an undesirable twisting in the resection surface.

To test for consistent seeding, a 2D signed distance map, $(\phi 1$, is calculated for the first resector or contour. The distance for each location in the plane from the contour is calculated. The sign is based on the side of the contour. One side is assigned as positive and the other as negative. The sign of $\phi 1$ is propagated from the plane into the whole volume such that every voxel in the volume is associated with a sign based on the first resector or contour. The propagation is orthogonal to the plane. This creates a volume of positive and negative signs. This volume is a reference sign map $\phi r$. For every additional resector or contour, the 2D signed distance map, $\phi$, in the plane of the additional contour is calculated based on the given resector or contour. The overlap in the plane of the additional contour between the current sign map $\phi$ and the reference sign map Φr is calculated. If the overlap is less that 50% of the slice in which the additional contour is drawn, then the seeding is inconsistent. The seeding is reversed, such as defining $\phi'=-\phi$. The seeds may be generated in act 22 of FIG. 1 using the updated distance map $\phi'$. Other tests for seed consistency may be used, such as testing for consistency along a line or lines orthogonal to a location spaced from the original contour.

Another test is for refinement, alteration, joining, modification, or other inconsistency in the contours themselves. This inconsistency may represent modification of an existing contour. Multiple contours are non-conflicting in two cases. First, if all the input contours are drawn in different parallel slices (i.e., the same view direction to different depths), there is not inconsistency in the contours. The seeds generated by these resectors do not conflict with each other, but may be inconsistent. Second, if the contours are within free bands of intersecting planes, then there is not inconsistency. For a first resector in a first plane, a free band is defined. Free bands are defined around each resector in the respective planes. If the resectors from other planes are within the free band of a given plane, there is no conflict.

If a resector from one plane is within a region outside the free band or a region to be seeded of another plane, there is a conflict. The orthogonal or non-parallel position of the planes means that the contour for one plane may indicate a location at the intersection as seeded, yet the contour of the other plane of the intersection may indicate that the location at the intersection is not seeded or seeded differently. This represents a conflict.

The conflict in contours is treated as user entry of a connection, refinement, modification, or alteration. The conflicting contours are to be combined. In this case, the resection surface should respect, as much as possible, all the input contours with the highest priority given to the last contour drawn. The conflict may be resolved by not using conflicting, lower priority contours.

For combination, the segmentation of act 24 is performed based on the highest priority contour. The remnant and resection volumes, $Res_1$ and $Rem_1$, are defined by the first resection. For each additional conflicting resector R (i.e., contour), the intersections of R with each of $Res_1$ and $Rem_1$ are calculated. If the intersection with $Rem_1$ is greater (larger number of voxels) than with $Res_1$, the resection algorithm or segmentation in act 24 is performed by replacing the whole liver mask L by $Rem_1$, the remnant of the first resection result. The new resection is performed on the remnant mask. If the intersection with $Res_1$ is greater than with $Rem_1$, the resection or segmentation in act 24 is performed by replacing the whole liver mask L by the resection set $Res_1$.

Figure 4:
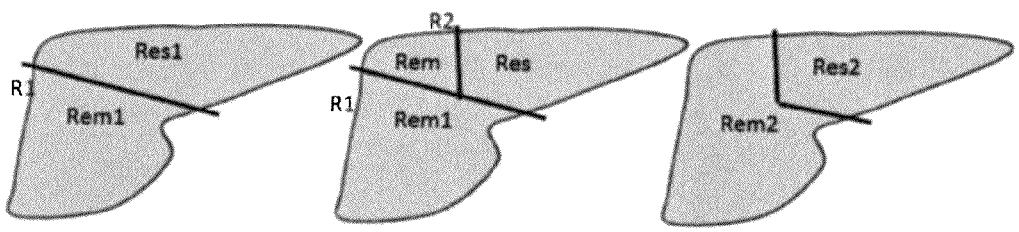
FIG. 4 illustrates combining resection results from two successive resections based on contours drawn in the same slice.

FIG. 4 shows an example. R1 on the left image is the original contour. R2 added in the center image is an added contour in the same plane. The added contour may be in an intersecting plane. The $Res_1$ from the left image is used instead of the whole liver since the intersection of R2 is mostly with $Res_1$. In the middle image, the Res and Rem volumes are determined from $Res_1$. The results are added to the original $Res_1$ and $Rem_1$, forming $Res_2$ and $Rem_2$ of the right image. The resection and remnants are integrated such that the connectivity of the final $Res_2$ and $Rem_2$ is preserved. The resulting contour is a combination of the original contour R1 and the subsequent contour R2. Other approaches to modification or combination may be used.

In act 22, seeds are identified from the contour. The seeds are spaced from the contour, so a band around the contour is also identified. Voxels of this free band are not assigned to a seed. The foreground seeds and background seeds are subsets of the foreground (representing the remnant) and background (representing the resection). Two sets of seeds are identified for each contour.

The seeds are identified in the plane of the contour. The free band is also in the plane in which the contour was created. The seeds and free band are voxels along the plane.

The processor generates the foreground and background seeds as a function of the user input of the 2D polyline. The input on a slice is used to generate seeds in that plane where the resector is drawn. For example, by inputting a line or points on a 2D CT image of a view of a cross-sectional slice, the resection and remnant locations used for seeding 3D segmentation are determined by the processor. The foreground refers to the part to be kept, and the background refers to the part to remove.

In one embodiment, the seeds are calculated using a Euclidean or other distance. For every voxel, v, intersecting or in the same plane as the contour, a distance to the contour is calculated. A map of the minimum Euclidean distances, $d(v)$, to the contour from the points is created.

The distances are signed. A positive or negative value is assigned for each distance. The sign is based on the side of the contour on which the voxel in the plane is positioned. To associate a sign for the distance at each point, the plane is divided into two sides P1 and P2 separated by the resector (i.e., contour). Positive is assigned to one side (e.g., P1), negative is assigned to another side (e.g., P2). The areas for the two sides may be used to determine the sign, such as using positive for the larger area side. The assignments are recorded in the distance map.

The signed distances are used to establish the seeds. One set of seeds is formed from voxels associated with positive distances, and the other set of seeds is formed from voxels associated with negative distances.

Rather than using all of the voxels, the seeds are formed from a sub-set. A band of voxels within a threshold distance to the contour are excluded from the seeds.

The same or different threshold magnitude is applied to the positive and negative distances. Any threshold may be used. For example, an empirically determined value is used. In one embodiment, the threshold is adaptive to the distances. For example, the threshold is set to a minimum of the maximum positive and maximum negative distance of the positive distances, all divided by ten. Other numbers than ten may be used. The threshold is set to a fraction of the minimum so that seeds are established on both sides of the contour (i.e., the threshold is not set beyond the liver).

Foreground and background seeds are assigned if the magnitude of the distance is greater than the threshold. The voxels within the threshold distance are free or unassigned to the seed. The voxels in this free band are not seeded.

Other approaches for seeding may be used. For example, a region of a predetermined or adaptive size spaced from the contour is assigned as the seed. Rather than a distance based approach without relying on intensities, the intensities may be used with distance for assigning the seed.

Other considerations may be included in the seeding. For example, any voxels of the plane associated with conflicting contour inputs are added to this free voxel set regardless of distance. As another example, each of the resection and remnant volumes are each limited to one connected component. If separation occurs, the largest seed is selected or intervening voxels are assigned to the seed.

In yet another example, voxels in the plane associated with one or more lesions to be resected are included in the background or resection seed. The goal of performing resection is to remove tumors from the liver while leaving the remaining healthy tissue intact. Using segmentation or user input, the voxels associated with the tumor are located. For example, a lesion mask T is loaded or received. The lesion mask T(v)=1 inside lesion and T(v)=0, otherwise. The lesion mask is dilated to create a safety margin, M, around the lesion. The amount of dilation or size of the safety margin is predetermined or adaptive. In one embodiment, the margin M is calculated as a sum of the diameters of the principle axes of the tumor, all divided by 10 or other value. The voxels of the plane included with the tumor after dilation are assigned to the resection or background seed. In other embodiments, the lesion mask is reduced or remains the same.

Figure 5:
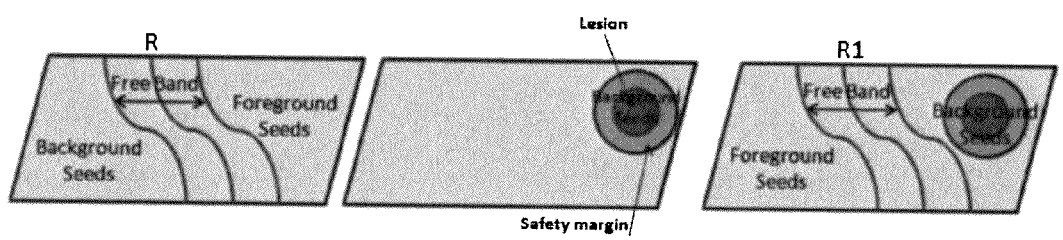
FIG. 5 illustrates inclusion of lesion locations for identifying seeds according to one embodiment.

The seeds are generated for each input contour. If a conflict exists between the seeds and the lesion, the labels generated by the contour are switched as the lesion is treated as correctly labeled for resection. FIG. 5 shows an example of a conflict between the seeds generated by the contour R and the seed lesions. The left image shows the seeds generated from the contour R, with the foreground assigned to the right side of the contour R. The middle image shows the lesion and dilated margin for the lesion. The voxels of the lesion are assigned to the background as the lesion is to be resected. However, according to the contour seeding, the same voxels are seeded to the foreground. To resolve this conflict, the seed labels of the contour are switched to obtain the final seeding in the right most image. Switching the seed labels does not make a difference in regards to the resector R as long as the resector is used to partition the space into two disjoint sets. Other resolutions may be used.

In act 24 of FIG. 1, the liver volume is segmented into two three-dimensional portions or volumes. The processor determines the resection volume and remnant volume of the liver. The portions of the liver volume are separated by a resection surface. All voxels or all voxels except for voxels of the resection surface are assigned to either the resection volume or the remnant volume. The liver is divided into the resection volume and the remnant volume. Three or more regions may be seeded and segmented in other embodiments.

The segmentation is a function of the seeds. The volume labels the voxels based on the seeds. The foreground and the background seeds are used to divide the liver into the remnant and resection portions, respectively.

The assignment uses an interconnection lattice of the liver volume. In act 26, a graph of interconnections is created. Any graph may be used. The graph defines vertices and edges for the liver. For example, each voxel is treated as a node or vertex. A six-connected lattice (connections along the x, y, and z axes) forms the edges between voxels. Other sub graphs, connection lattices, or vertex assignments may be used.

Weights may be assigned to the edges. In one embodiment, the weights are not a function of the intensities. For example, the weights are a function of distances to each of the contours and seeds, such as the weights being one if the vertices are adjacent (connected) and zero otherwise. Other geometric weighting may be used. The assignment may occur without using intensity information. The weights may alternatively be a function of the intensities or difference in intensities for the connected vertices of each edge.

In act 27, the weights for the edges include vessel information. The resection process should be performed without devascularizing the healthy tissue. Hence, cutting through the vessels should be avoided as much as possible. To avoid cutting vessels, edges associated with vessels are weighted more heavily, reducing the probability of the resection surface is through the vessel. The weights are set to avoid voxels of the same vessel being within different portions and/or to bias the vessels into the remnant portion. The segmenting is weighted as a function of one or more vessels in the liver so that the separation of the liver is based, in part, on one or more vessels.

In one example embodiment of integrating vessel information, the vessel information is integrated into resection using distance in the weighting. A vessel mask is created to determine the distance. Using either manual designation or automated detection, any vessels or vessels with a threshold diameter are identified. A vessel tree mask is created, such that V(v)=1 if the voxel v belongs to the vessel tree and V(v)=0, otherwise. The mask is loaded from an electronic storage device, memory or a communication channel from an external source.

The distance of each voxel from the vessel tree is calculated. The distance of voxels in the vessel tree is set at zero. The calculated distances weight the graph representing the liver volume. Any mapping of the distance to the weight may be used. The mapping is such that the weights $w_{ij}$ become smaller when the distance d from the vessel tree increases. For example, the weight contribution from vessel distance is the inverse of the sum of 1 and a monotonic function (e.g., $d^2$) of the distance, d, to the closest vessel branch. Other weighting functions may be used. Other monotonically increasing functions may be used. The weighting biases the segmentation or resection surface away from the vessels. The weights from the vessel consideration are summed, multiplied, averaged, or combined with the edge weights.

In act 28, a random walker algorithm is applied to the graph. The random walker function assigns unseeded voxels of the liver volume to the resection and remnant portions.

The seeds are along one or more planes. The random walker function expands the segmentation into three dimensions based on the planar seeds. The random walker function partitions the volume.

Using the lattice or interconnections, the random walker calculates probabilities in act 28. The probabilities are of each of the unassigned voxels being associated with each of the seeds. Since two seeds are used (i.e., foreground and background), two probabilities are determined for each voxel not in a seed.

The weights interconnecting the voxels are used to determine the seed most likely connected to each voxel. In one embodiment, a sparse, positive-definite system of linear equations is solved with the graph Laplacian matrix. An energy minimization is applied to the graph matrix.

In act 30, the voxels are assigned to the foreground and the background. The probabilities are used to assign the voxels. The label for the seed associated with the highest probability for a given voxel is used as the label for that voxel. The labeling separates the graph into the resection volume and the remnant volume. The liver volume is divided into two portions using the random walker function on the created graph and the foreground and background seeds.

Other acts may be performed. For example, the volume of the resected mask is assumed to be less than the volume of the remnant mask. This condition is checked after the resection is complete. If the resection volume is larger, the labels for the remnant and resection volumes are switched. If the switch places the tumor in the remnant, then an error may be presented or a request for refinement may be output. If a switch occurs, the location of vessels may be checked. Alternatively, the switch occurs in the seeding stage so that vessel-based weighting is performed again.

In act 34, the resection information is output. The resection volume or the remnant volume is output. The output may be a map or voxel matrix of labels. The output is transferred or stored.

In one embodiment, the output is an image. The image shows the resection highlighted relative the remnant. The highlighting may be a difference in brightness, color, or other characteristic of the two portions. The portions are alternatively displayed separately. An animation may be provided such that the resection is shown being or as removed in juxtaposition with the whole liver.

Figure 7:
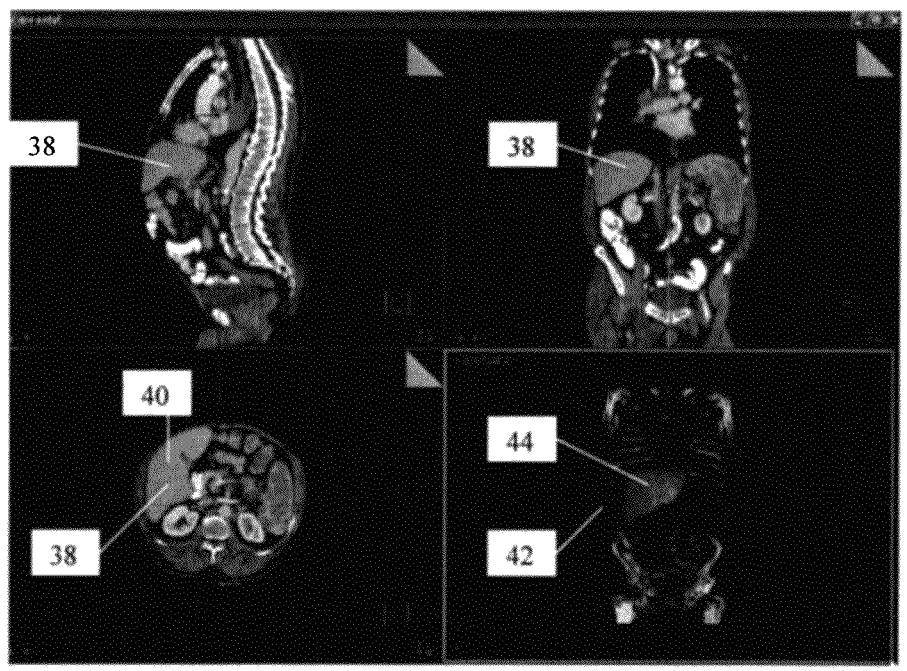
FIG. 7 is an example medical image of FIG. 6 but with a resection line determined by a processor replacing the user drawn contour and highlighting of the resection in the 3D rendering.
Figure 8:
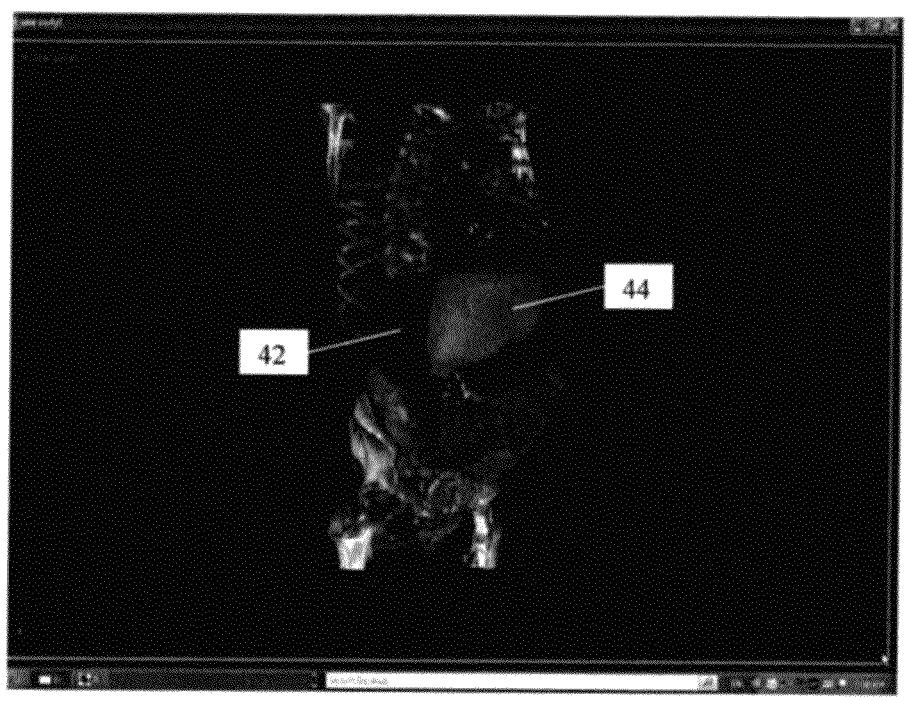
FIG. 8 is an example medical image of a 3D rendering showing resected and remnant volumes.

The image is a two or three-dimensional image. For example, the resection and/or remnant portions are shown in a two-dimensional image. FIG. 7 shows three cross-section images. The liver 38 is shown in all three images. In the lower left image, a resection line 40 separates the resection portion from the remnant portion. The lower right image is a three-dimensional rendering of the liver from a user selected or system determined viewing direction. The liver has the remnant 44 in gray scale and the resection 42 colored red or darker. FIG. 8 shows a larger rendering showing the resection volume 42 and the remnant volume 44. Other imaging may be provided.

For minimal user interaction, a single 2D resector in one canonical plane is provided. The 3D resection of the liver is output. The process may be repeated. For example, the images are generated in response to input of a polyline. As additional polylines are added, the user selects different two-dimensional views. The resulting resection surface changes as well. The three-dimensional rendering or other representation of the relative portions is regenerated based on the changes as the changes are made. The user can repeat the resection as many times as necessary to remove any number of tumors or to obtain a fine resection of a particular part of the liver. The user may resect the liver again by drawing a polyline in the remnant liver.

FIG. 9 shows a system for liver resection planning. The system includes an imaging system 48, a memory 52, a processor 50, and a display 54. Additional, different, or fewer components may be provided. For example, a network or network connection is provided, such as for networking with a medical imaging network or data archival system. In another example, a user interface is provided for user input of a line or points, selection of viewing planes, or other interaction. The user interface may include input devices, such as a mouse, keyboard, buttons, sliders, trackballs, touch pads, and/or touch screens.

The processor 50 and display 54 are part of a medical imaging system 48. Alternatively, the processor 50 and display 54 are part of an archival and/or image processing system, such as associated with a medical records database workstation or server. In other embodiments, the processor 50 and display 54 are a personal computer, such as desktop or laptop, a workstation, a server, a personal data assistant, a smart phone, a tablet computer, or combinations thereof. The processor 50, display 54, and memory 52 may be provided without other components for acquiring data by scanning a patient.

The imaging system 48 is a medical diagnostic imaging system. Ultrasound, computed tomography (CT), x-ray, fluoroscopy, positron emission tomography, single photon emission computed tomography, and/or magnetic resonance (MR) systems may be used. The imaging system 48 may include a transmitter and includes a detector for scanning or receiving data representative of the interior of the patient.

In one embodiment, the imaging system 48 is a CT system. An x-ray source is connected with a gantry. A detector is also connected with the gantry opposite the x-ray source. The patient is positioned between the source and detector. The source and detector are on opposite sides of the patient and rotate about the patient. The detected x-ray energy passing through the patient is converted or transformed into data representing different spatial locations within the patient.

The memory 52 may be a graphics processing memory, a video random access memory, a random access memory, system memory, cache memory, hard drive, optical media, magnetic media, flash drive, buffer, database, combinations thereof, or other now known or later developed memory device for storing data or video information. The memory 52 is part of the imaging system 48, part of a computer associated with the processor 50, part of a database, part of another system, a picture archival memory, or a standalone device.

The memory 52 stores data representing a region of a patient. The region is a three-dimensional region. The region is of any part of the patient, such as a region within the chest, abdomen, leg, head, arm, cardiac system, heart, vessel, or combinations thereof. The region includes the liver in one embodiment. The data is from scanning the region by the imaging system 48. The memory 52 may alternatively or additionally store data during processing, such as storing segmentation maps, liver indications, voxels, intensities, seed locations, input polylines, created contours, maps, labels, band locations, conflict information, consistency information, graphs of interconnections, weights, graphic overlays, quantities, an output image, or other information discussed herein.

The memory 52 or other memory is alternatively or additionally a non-transitory computer readable storage medium storing data representing instructions executable by the programmed processor 50 for liver resection planning. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multi-processing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 50 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for segmentation of a boundary. The processor 50 is a single device or multiple devices operating in serial, parallel, or separately. The processor 50 may be a main processor of a computer, such as a laptop or desktop computer, or may be a processor for handling some tasks in a larger system, such as in an imaging system. The processor 50 is configured by instructions, design, hardware, and/or software to perform the acts discussed herein.

The processor 50 is configured to perform the acts of FIG. 1 or other acts. The processor 50, using user input and/or viewing directions, creates one or more contours. The contours are used to determine resection and remnant seeds. Alternatively, the processor 50 determines the seeds based on other inputs or without input. The processor 50 segments the volume based on the seeds, such as segmenting using a processor created graph of the liver. The processor 50 generates outputs, such as images showing the remnant and/or resection volumes in one or more views for planning.

The display 54 is a monitor, LCD, projector, plasma display, CRT, printer, or other now known or later developed devise for outputting visual information. The display 54 receives images, graphics, text, quantities, or other information from the processor 50, memory 52, or imaging system 48. One or more medical images are displayed. The images are of a region of the patient. In one embodiment, the images are CT images. The image includes an indication, such as a graphic or colorization, of the resection surface, the remnant, and/or the resection. Alternatively or additionally, the image includes a quantity based on the resection, surface, and/or remnant. The quantity may be displayed as the image without the medical image representation of the patient.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for preoperative resection planning, the method comprising:
    acquiring data representing a volume of a liver of a patient;
    generating a two-dimensional view of a slice of the liver from the data;
    receiving, from a user input device, user input of a plurality of points or line relative to the two-dimensional view;
    creating, by a processor, a contour in the slice from the points or line;
    identifying, by the processor, a band around the contour from the data of the slice within a threshold distance of the contour;
    identifying, by the processor, first and second seeds separated by the contour, wherein the first and second seeds are outside the band;
    segmenting, by the processor, the volume into first and second three dimensional portions based on the first and second seeds from the slice; and
    outputting an image showing a resection as the first three-dimensional portion.

2. The method of claim 1 wherein acquiring the data comprises acquiring computed tomography data.

3. The method of claim 1 wherein acquiring the data comprises segmenting the liver from surrounding tissue, the data being voxels of the liver and not the surrounding tissue.

4. The method of claim 1 wherein generating the two-dimensional view comprises generating in response to a selection of the slice by a user.

5. The method of claim 1 wherein creating comprises extending the points or line as a continuous curve between edges of the liver in the slice.

6. The method of claim 1 wherein identifying comprises:
    calculating a Euclidean distance from the contour to each point in the slice;
        assigning a sign to each of the Euclidean distances based on side of the contour on which each of the points occurs;
        setting the first seed as the points for positive ones of the Euclidean distances above a positive threshold and the second seed as the points for the negative ones of the Euclidean distances below a negative threshold.

7. The method of claim 1 wherein segmenting comprises applying a random walker algorithm.

8. The method of claim 1 wherein the second seed is for a foreground and the first seed is for a background, and wherein segmenting comprises:
    creating an interconnected graph as a function of voxels for the volume;
    calculating probabilities for each of the voxels being associated with each of the first and second seeds; and
    assigning the voxels to the foreground and background as a function of the probabilities, wherein the foreground comprises the first portion and the background comprises the second portion.

9. The method of claim 1 further comprising:
    receiving, from the user input device, user input of another plurality of points or another line relative to the volume;
    creating, by the processor, another contour; and
    testing for conflict between the contour and the other contour.

10. The method of claim 9 further comprising making seeding consistent between the contour and the other contour where the testing shows no conflict, wherein the first and second seeds are a function of the contour and the other contour.

11. The method of claim 9 further comprising combining the contour and the other contour where the testing shows a conflict, wherein the first and second seeds are a function of the contour and the other contour.

12. The method of claim 1 further comprising:
    weighting the segmenting as a function of a vessel in the liver such that the vessel is weighted to be in the second three-dimensional portion.

* * * * *